(No Model.)
R. B. RALLS.
COMBINED ROLLER AND CULTIVATOR.
No. 330,514. Patented Nov. 17, 1885.
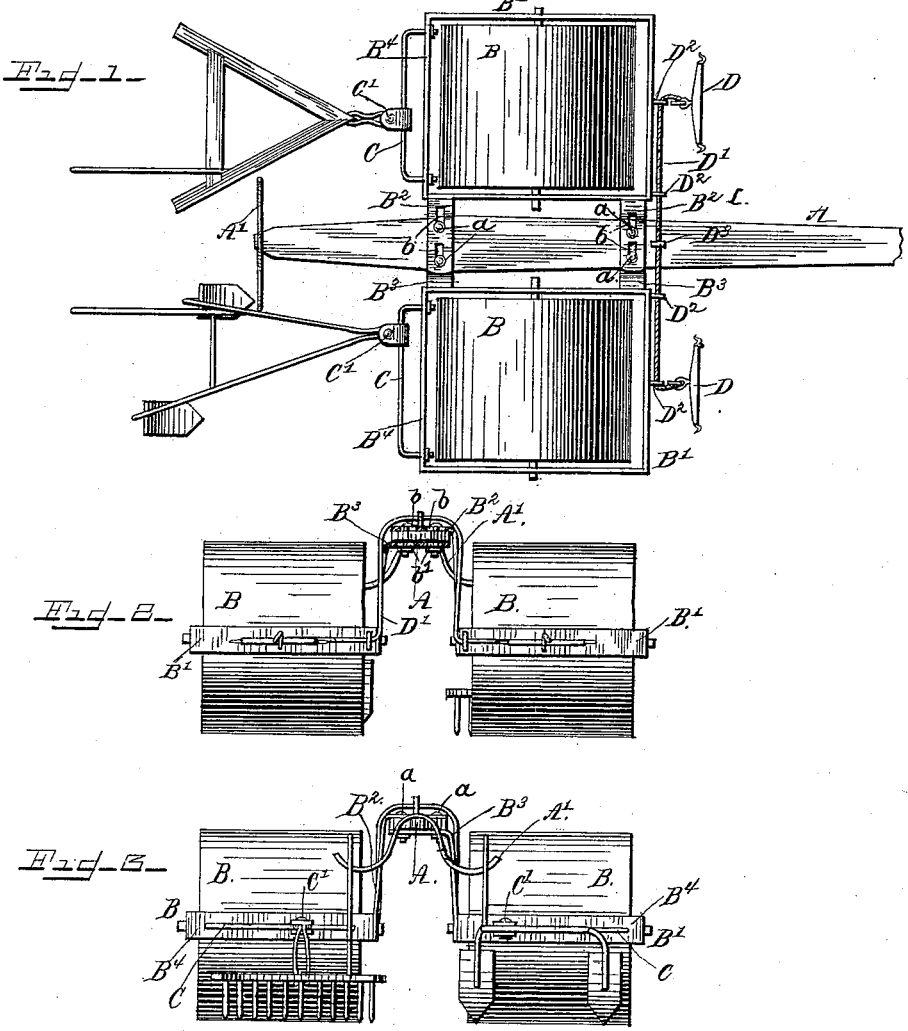
WITNESSES
R. W. Bishop.
G. P. Kramer.
Robert B. Ralls
INVENTOR
By R. S. & A. P. Lacey
Attorneys.

UNITED STATES PATENT OFFICE.

ROBERT B. RALLS, OF MONTROSE, MISSOURI, ASSIGNOR OF ONE-HALF TO JAMES D. RALLS, OF SAME PLACE.

COMBINED ROLLER AND CULTIVATOR.

SPECIFICATION forming part of Letters Patent No. 330,514, dated November 17, 1885.

Application filed August 20, 1885. Serial No. 174,899. (No model.)

*To all whom it may concern:*

Be it known that I, ROBERT B. RALLS, a citizen of the United States, residing at Montrose, in the county of Henry and State of Missouri, have invented certain new and useful Improvements in a Combined Roller and Cultivator; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in combined land rollers, harrows, and cultivators; and it consists in certain novel features hereinafter described, and specifically pointed out in the claim.

In the annexed drawings, Figure 1 is a plan view, and Figs. 2 and 3 are front and rear elevations, respectively, of my device.

A designates the tongue, to which the carrying-frame is attached, and by which the machine is steered when in use. The rear end of the tongue is provided with a double hook, A', upon which the cultivator or harrow may be hung out of the way when not in use. This double hook depends over each side of the tongue, as shown, and thus enables the operator to raise one or both of the harrows or cultivators, as will be understood. The land-rollers B B are carried in frames B' B', which are supported by the tongue, being attached thereto by means of hangers B² B³, as shown. These hangers B² B³ are rigidly secured at one end to the frames B' B', and extend vertically upward therefrom. They are bent at right angles at their upper ends, the hangers B² passing over the tongue and the hangers B³ under the same. The hangers are secured to the tongue by bolts $a$, passed through the tongue, and slots $b\ b'$, formed in the hangers. By slackening the nuts of the bolts the hangers may be adjusted to and from each other, thus setting the rollers a greater or less distance apart, as may be desired, and they may be held in their adjusted positions by again screwing home the nuts previously unscrewed. The frames B' B' are rectangular, as shown, and surround the rollers, as shown. They may be composed of a single bar bent into the desired shape, or may be composed of separate side and cross bars connected at their ends in any suitable manner so as to form the corners of the frames. The rear cross-bars, B⁴, are provided with support-rods, C, to which the harrows or cultivators are attached by clips C'.

In the drawings I have shown a harrow attached to one frame and a cultivator attached to the other; but it will be understood that two cultivators or two harrows could be used. The clips C' can be set at any point desired on the rods C, and the cultivators or harrows may thus be adjusted to and from each other farther than they will necessarily be by the adjustment of the rollers hereinbefore described. The horses are harnessed to whiffletrees D D, which are connected to the roller-carrying frames B' B' and to each other by a chain or rope, D', which passes through rings or eyes D² D² upon the front cross-bars of the frames B' B' and up over the tongue through an eye or ring, D³. Two of the eyes or rings, D², are provided on each of the front cross-bars of the frame B'—one at the inner corner and one at or near the center, directly behind the whiffletree. By using this rope or chain D' to connect the whiffletrees they are accommodated to the adjustments of the rollers, and the draft is equalized. The rollers are journaled in the side bars of the frames B' B'. When it is desired to use the rollers alone, the cultivators or harrows may be removed; or they can be lifted and caught upon the hooks A'.

Having thus described my invention, what I claim, and desire to secure by Letters Patent, is—

The combination, with the tongue, of a pair of rectangular frames provided with rollers located one on either side of the tongue, hangers rigidly attached to the adjacent sides of the frames, and having their upper ends slotted and bent, the one beneath, the other above, the tongue, and bolts passed through the slotted ends of the hangers and the tongue, substantially as shown, whereby the frames may be adjusted to and from each other and remain at right angles to the line of draft.

In testimony whereof I affix my signature in presence of two witnesses.

ROBT. B. RALLS.

Witnesses:
HENRY S. MARVIN,
JAS. H. VICKARS.